(12) United States Patent
Jimenez et al.

(10) Patent No.: US 10,794,491 B2
(45) Date of Patent: Oct. 6, 2020

(54) WHEELEND ASSEMBLY SEAL

(71) Applicant: STEMCO PRODUCTS, INC., Charlotte, NC (US)

(72) Inventors: Daniel T. Jimenez, Diana, TX (US); Monte L. Pearson, Longview, TX (US); Mark N. Gold, Hallsville, TX (US); David W. Bell, Hallsville, TX (US)

(73) Assignee: Stemco Products, Inc., Charlotte, NC (US)

( * ) Notice: Subject to any disclaimer, the term of this patent is extended or adjusted under 35 U.S.C. 154(b) by 0 days.

(21) Appl. No.: 16/606,697

(22) PCT Filed: Jun. 5, 2018

(86) PCT No.: PCT/US2018/036095
§ 371 (c)(1),
(2) Date: Oct. 18, 2019

(87) PCT Pub. No.: WO2018/231591
PCT Pub. Date: Dec. 20, 2018

(65) Prior Publication Data
US 2020/0124179 A1    Apr. 23, 2020

Related U.S. Application Data

(60) Provisional application No. 62/518,829, filed on Jun. 13, 2017.

(51) Int. Cl.
*F16J 15/3256* (2016.01)
(52) U.S. Cl.
CPC .............................. *F16J 15/3256* (2013.01)

(58) Field of Classification Search
CPC .. F16J 15/3256; F16J 15/3252; F16J 15/3248; F16J 15/3204; F16J 15/3216; F16J 15/322; F16J 15/3232
(Continued)

(56) References Cited

U.S. PATENT DOCUMENTS 4,285,526 A * 8/1981 Klinteberg ........... F16J 15/3256
                                                    277/551
4,655,618 A * 4/1987 Labedan ................. F16C 19/44
                                                    277/562

(Continued)

FOREIGN PATENT DOCUMENTS

RU       2338106        11/2008
WO       2018231591     12/2018

OTHER PUBLICATIONS

International Searching Authority, International Search Report and Written Opinion, PCT/US2018/036095, Applicant: Stemco Products, Inc., dated Sep. 13, 2018, 6 pages.

*Primary Examiner* — Nathan Cumar
(74) *Attorney, Agent, or Firm* — Perkins Coie LLP

(57) ABSTRACT

A wheelend assembly seal between the hub of a wheelend and a spindle shaft is provided. The wheelend assembly seal is a seal device having at least a static seal structure, a wear ring, and a dynamic seal structure. The dynamic seal structure comprises a resilient member that is biased such that in an uninstalled state, the resilient member diverges from an axially extending portion of the dynamic seal structure. When installed, the resilient member is compressed to be approximately parallel the axially extending portion and forms a seal between the surface of the resilient member and the outer surface of the spindle shaft.

11 Claims, 9 Drawing Sheets

(58) Field of Classification Search
USPC .......................................................... 277/411
See application file for complete search history.

(56) References Cited

U.S. PATENT DOCUMENTS

| | | | | |
|---|---|---|---|---|
| 5,211,406 A | * | 5/1993 | Katzensteiner | ...... F16J 15/3256 |
| | | | | 277/351 |
| 5,348,312 A | * | 9/1994 | Johnston | .............. F16J 15/3256 |
| | | | | 277/375 |
| 6,186,507 B1 | * | 2/2001 | Oldenburg | ............. F16J 15/324 |
| | | | | 277/353 |
| 6,315,296 B1 | * | 11/2001 | Oldenburg | ........... F16J 15/3256 |
| | | | | 277/353 |
| 7,658,386 B2 | * | 2/2010 | Oldenburg | ........... F16J 15/3256 |
| | | | | 277/353 |

* cited by examiner

WHEELEND ASSEMBLY SEAL

CROSS-REFERENCE TO RELATED PATENT APPLICATIONS

The present application claims priority to U.S. Provisional Patent Application Ser. No. 62/518,829, filed Jun. 13, 2017, the disclosure of which is incorporated herein by reference as if set out in full.

BACKGROUND

Wheelend axle or spindle assemblies are used on large trailers, semi-trailer, and the tractors that pull the same. The wheel end assemblies included, among other things, a hub or main body, an inboard bearing assembly, a spacer, an outboard bearing assembly. A cavity is defined by the hub to hold lubricant for the bearing assemblies, which allow rotation of the tire on the fixed axle. The wheelend assembly has an end cap on the outboard side of the wheelend assembly and an oil seal on the inboard side of the assembly.

A conventional wheelend assembly 10 is shown in FIG. 1. Wheel end assembly 10 includes a vehicle hub 12 mounted on a stationary spindle shaft 14 and supported by inboard and outboard roller bearings 18 and 20. The interior bore 22 of vehicle hub 12 defines a chamber for accommodating lubricant which continuously bathes roller bearings 18 and 20. A hub cap 24 encloses the outboard end of the interior bore 22 of vehicle hub 12 and the inboard end of the interior bore 22 is sealed by a dynamic hub seal device 30 mounted adjacent the inboard end of spindle shaft 14. The hub seal device 15 is designed to seal lubricant within the interior bore 22 of vehicle hub 12 and prevent contaminants from entering the interior bore 22 of vehicle hub 12 from the inboard air side of the seal device. During vehicle operation, the vehicle hub 12 rotates about the spindle shaft 14 supported by roller bearings 18 and 20.

FIG. 2 shows a conventional seal device 15. Other more effective seal devices are available from STEMCO LP with a principal place of business at 300 Industrial Blvd., Longview, Tex., in more detail in a partial cross-sectional view. Seal device 15 is shown installed with the wheelend assembly 10 on a spindle shaft 14. The seal device 15 forms an inboard oil seal between the spindle shaft 14 and the rotating wheelend assembly 10. The seal device 15 includes, among other things, an outer annular seal member 24 which has a first seal surface 26 which is press fit within the bore 28 in hub 18 with a metal-to-metal contact. An inner-annular seal member 30 includes a second seal surface 32 for frictional non-rotational sealing engagement about the spindle shaft 14 (sometimes referred to as an axle). A rotational seal element 34 is provided which is secured to the outer seal member for rotational sealing engagement with respect to the inner seal member. Preferably the rotational seal element 34 includes elastomeric seal 36 which is molded and secured to the outer annular seal member 24. Seal member 24 engages a wear sleeve surface 38 on the inner annular seal member 30 so that the seal 36 rotates with the outer annular seal member 26 and with hub 12 about the inner annular seal member 30 and axle 14.

FIG. 3 shows a seal device 50 available from STEMCO LP identified above. Seal device 50 is a significant improvement over the seal member 30 described above. FIG. 3 shows the seal device 50 is between a spindle shaft 52 and a hub 54. The rotating hub 54 is rotationally coupled to the stationary spindle shaft 52 by a pair of roller bearing assemblies 56, of which only the inboard roller bearing assembly 56 is shown. The inboard roller bearing assembly includes a bearing, a bearing race, and a cup as is generally known in the art.

The seal device 50 includes an elastomeric static seal structure 60 with a plurality of seal ribs 62 extending radially outward from the static seal structure. Internal to the static seal structure 60 is a wear ring 64. The wear ring 64 includes a axially extending portion 66 and an radially, inwardly depending portion 68. A molded elastomeric seal structure 70 is substantially coextensive with the interior surfaces of the axially extending portion 66 and the radially, inwardly depending portion 68. The seal structure 70 includes a deformable seal lip 72 that projects from the radially, inwardly depending portion 68 of the wear ring 64, which interacts with the interior of an outer casing 74 of the seal device 50. The seal structure 70 further includes a seal surface 76 that seals with the surface of the spindle shaft 52. The seal surface 76 includes a plurality of beads 78 that facilitate the seal. The interference and bead quantity are factors that facilitate the seal, but also effect the installation and removal force.

The seal devices above, while functional, exhibit significant axial resistance when the wear sleeve is press fit onto the vehicle axle during installation, unnecessarily increasing axial installation forces, which make it increasingly difficult to install a unitized wheelend assembly 10. Typically, the installation requires lubricant and the like. Without lubricant, the seal device is subject to early failure. Thus, based on the foregoing, there is a need for improved wheelend assembly seals.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some aspects of the technology, a seal device for a shaft is provided. The seal device comprising, a static seal structure, a wear ring, and a dynamic seal structure. The dynamic seal structure comprising: an axially extending portion; an radially depending portion, wherein the radially depending portion comprises at least one unitizing protrusion; a terminal portion; and a resilient member extending axially along the axially extending portion, wherein the resilient member is biased to diverge from the axially extending portion at an angle.

In certain embodiments, the seal device is configured for installation between a spindle shaft and a hub of a wheelend assembly. The wheelend assembly comprising at least an inboard bearing assembly, an outboard bearing assembly, and a hub.

In certain embodiments, the wear ring and the dynamic seal structure are generally coextensive.

In certain embodiments, the resilient member of the dynamic seal has a distal end and a support ridge protrudes radially from the distal end to contact the axially extending portion when the resilient member is compressed.

In certain embodiments, a gap exists between the axially extending portion and the resilient member.

In certain embodiments, a support pad resides on the axially extending portion and the resilient member contacts the support pad at an interference when the resilient member is compressed.

In certain embodiments, the support pad comprises a plurality of support pads each having a width, wherein the plurality of support pads are not contiguous and are arranged circumferentially around the axially extending portion. In some aspects, the plurality of support pads are arranged symmetrically and, in other aspects, the plurality of support pads are arranged asymmetrically.

These and other aspects of the present system and method will be apparent after consideration of the Detailed Description and Figures herein.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

The technology of the present application is described with specific reference to a wheelend assembly. However, the technology described herein may be used for other shaft seal application including other spindle shaft sealing applications, and the like. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Figure 1:
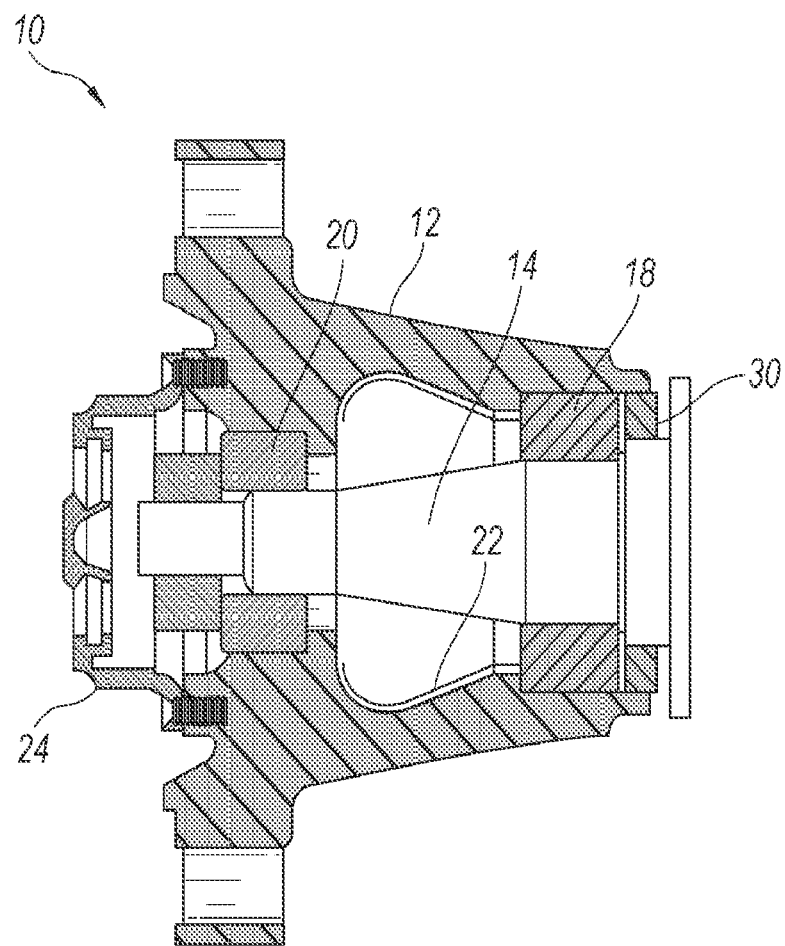
FIG. 1 is a cross sectional view of a prior art wheelend assembly.
Figure 2:
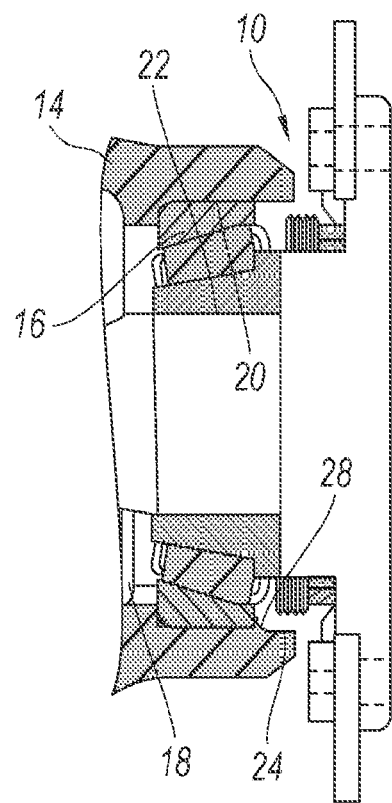
FIG. 2 is a cross sectional view of the seal device of FIG. 1.
Figure 3:
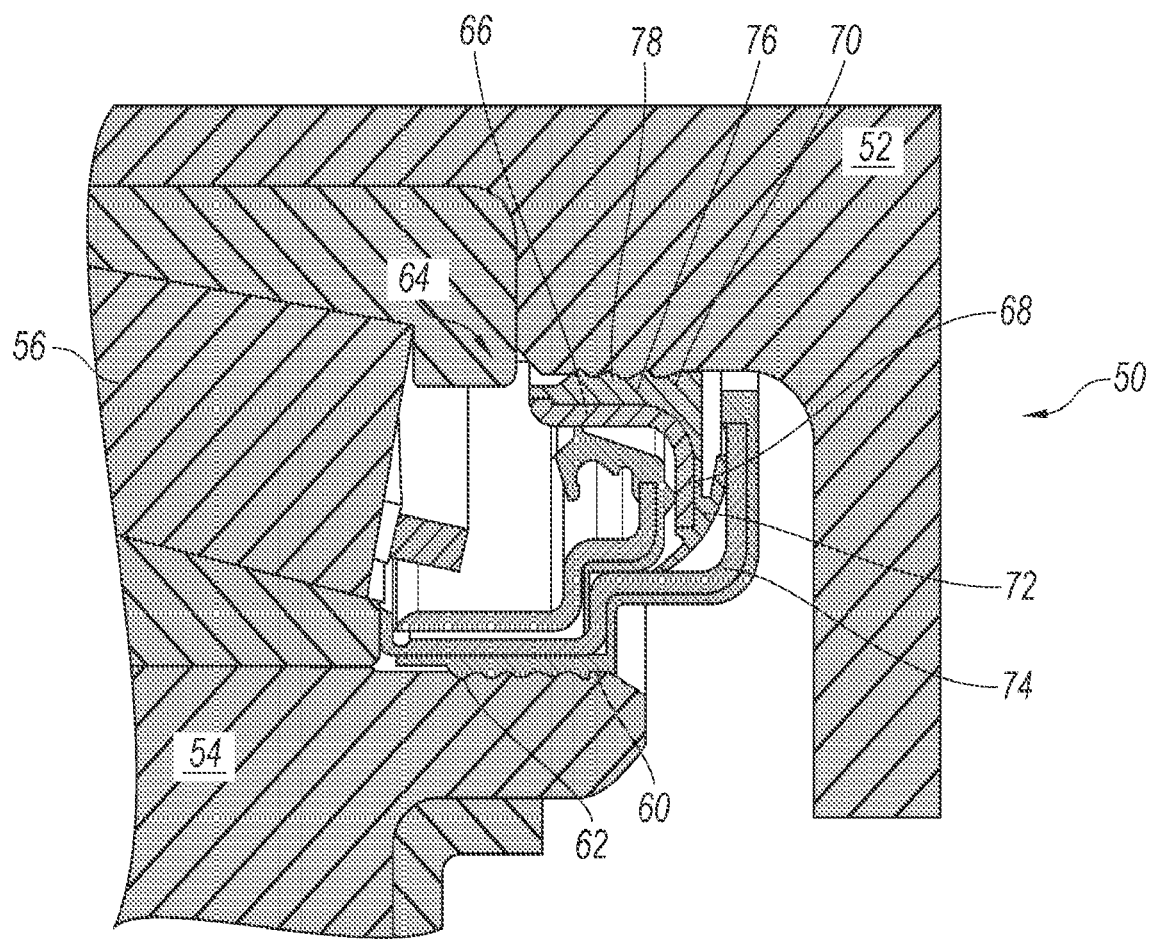
FIG. 3 is a cross sectional view of another seal device.
Figure 4:
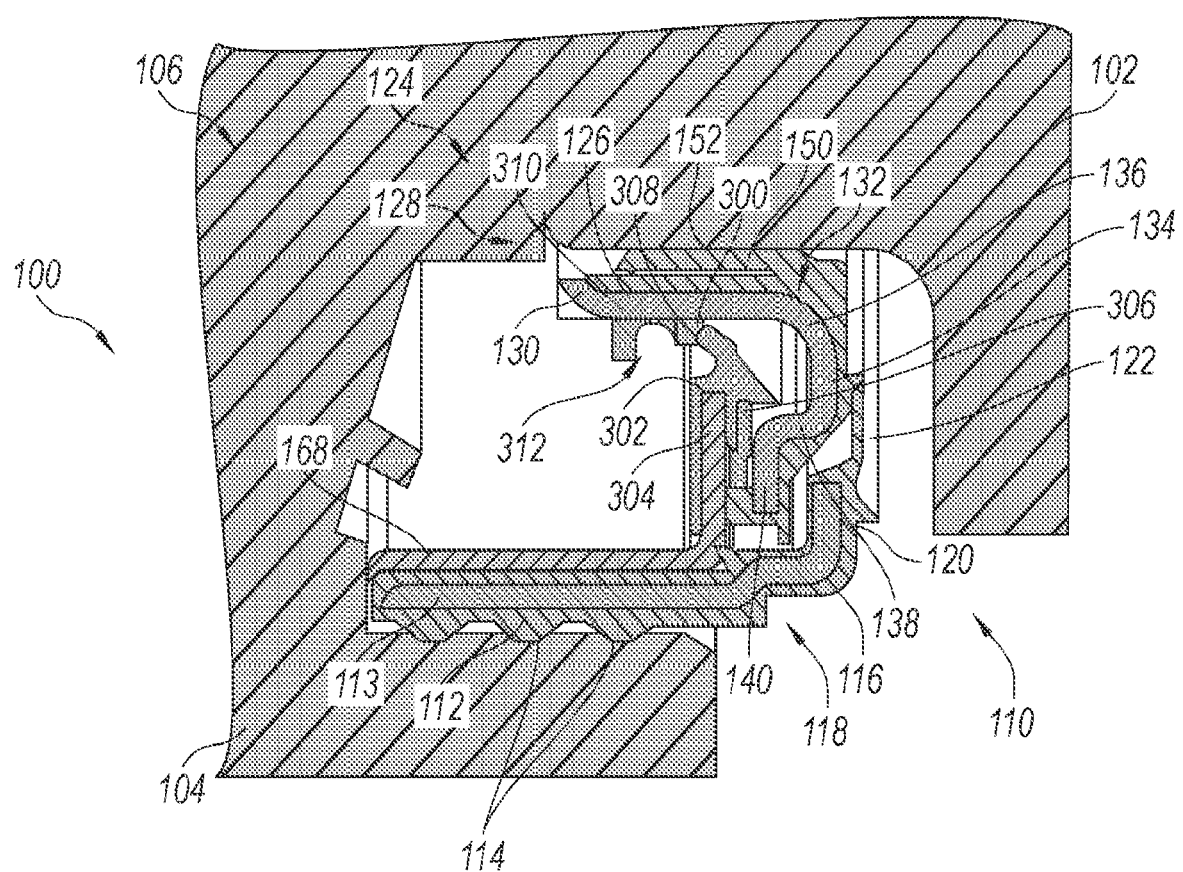
FIG. 4 is a cross sectional view of a wheelend assembly seal consistent with the technology of the present application.

With reference now to FIG. 4, a wheelend assembly seal 100 is provided. The wheelend assembly 100 is installed on a spindle shaft 102 (or axle 102). The wheelend assembly 100 comprises, among other things, a hub 104 and inboard bearing assembly 106. A seal device 110 is positioned between the spindle shaft 102 and the hub 104. A seal device 110 is often part of a unitized wheelend assembly 100 but may be separately installed.

The seal device 110 includes an outer diameter ("OD") static seal structure 112 with a plurality of seal ribs 114 extending radially outward from the static seal structure. The OD static seal structure 112 has a first axially extending portion 114 and a second axially extending portion 116, which has a length shorter than the first axially extending portion 114. A transitional portion 118 is between the first and second axially extending portions 114, 116. The inboard end 118 of the OD static seal structure 112 has a radially, inwardly depending portion 120 that extends inwardly from the second axially extending portion 116 at an angle, which is shown as approximately a 90 degree angle, but could be anywhere from about 85 to 105 degrees. The radially, inwardly depending portion 120 terminates at a contamination protrusion 122. The OD static seal structure 112 is generally carried on an outer case member 113.

Internal to the OD static seal structure 112 is a wear ring 124. The wear ring 124 includes a generally axially extending portion 126 having an outboard end 128 that terminates in a radially, inwardly extending hook portion 130. An inboard end 132 of the generally axially extending portion 126 has a radially, outwardly extending portion 134. The wear ring 124 includes a transition portion 136 from the generally axially extending portion 126 to the radially, outwardly extending portion 134. The transition portion 136 generally has at least a 1st radius, not specifically shown. The radially, outwardly extending portion 134 includes a transition offset 138, which is axially extending. The transition offset 138 may have a 2nd radius transition on the inboard side and a 3rd radius transition on the outboard side that transitions to radially, outwardly extending end portion 140 of the wear ring 124. The radially, outwardly extending end portion 140 is separated from the OD static seal structure 112 by a gap and overlaps in part with the radially, outwardly depending portion 120. As can be appreciated from the figure, the contamination protrusion 122 extending outwardly from the radially, outwardly depending portion 120 overlaps a portion of the radially, outwardly extending portion 134 of the wear ring 124.

Generally co-extensive with the wear ring 124 is an inner diameter ("ID") static seal structure 150. The ID static seal structure 150 provides a seal with a surface of the spindle 102. The ID static seal structure 150, which will be explained further below, has a biased resilient member that is compressed by the interference fit between the surface of the spindle and the ID static seal structure 150 to form a seal interface 152.

A dynamic seal 300 is coupled to an inner case member 168. The dynamic seal 300 includes a coupling portion 302, such as the groove 304 formed by walls 306. A biased running member 308 has a running surface 310 that forms a seal with the axially extending portion 126 of the wear ring 124. The dynamic seal 300 may include a groove 312 to receive a resilient member (not shown in FIG. 4) to provide radial loading.

Figure 5:
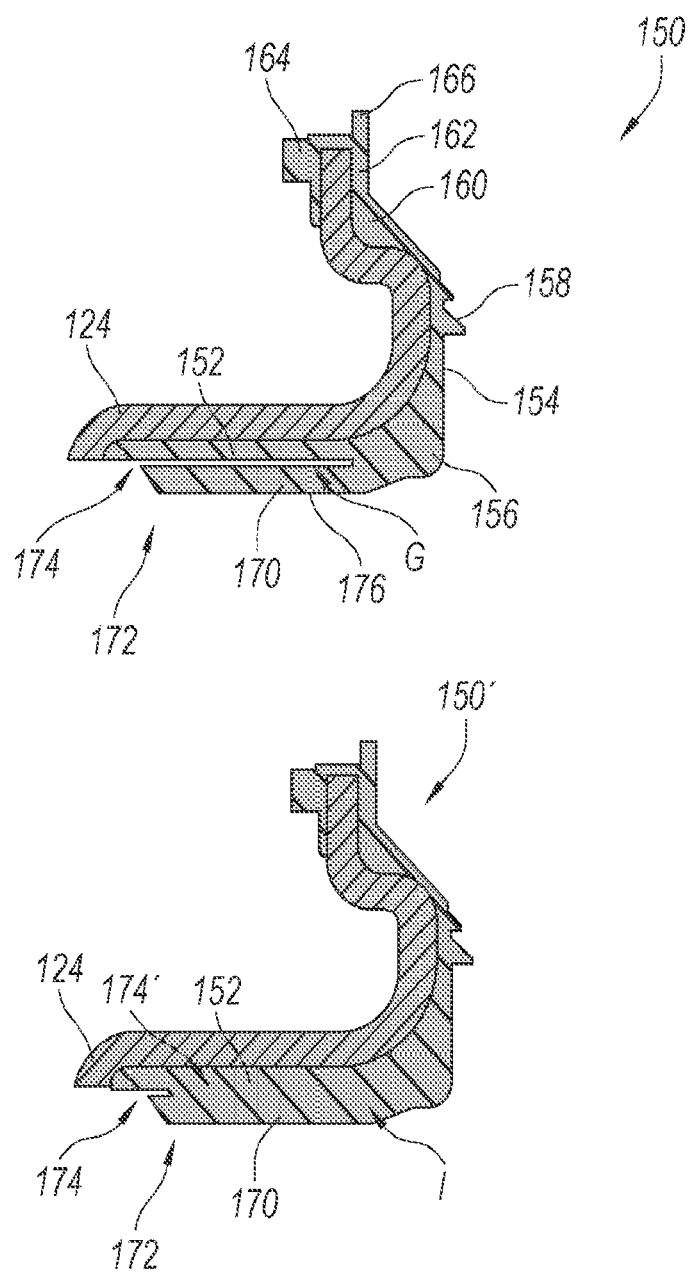
FIG. 5 is a cross sectional view of a portion of the wheelend assembly seal of FIG. 4 consistent with the technology of the present application.

FIG. 5 shows the ID static seal structure 150 and wear ring 124 in isolation for convenience. For orientation, the ID static seal structure 150 and wear ring 124 are oriented opposite the quadrant shown in FIG. 4. The ID static seal structure 150, which is generally formed from an elastomer, is generally co-extensive with the wear ring 124. In certain embodiments the elastomer is natural rubber, synthetic rubber, such as nitrile rubber, hydrogenated nitrile butadiene rubber, or the like. The ID static seal structure 150 has an axially extending portion 152 and a radially, outwardly depending portion 154. A transition portion 156 transitions between the axially extending portion 152 and the radially, outwardly depending portion 154. The radially outwardly depending portion has a contamination shelf 158 extending axially that provides a shelf onto which the contamination protrusion 122 (FIG. 4) terminates. The ID static seal structure 150 further has an offset portion 160 a terminal portion 162 that encases the radially, outwardly extending end portion 140. The terminal portion 162 has an axial bumper 164 and a radial bumper 166. The axial bumper 164 engages the inner case member 168 (FIG. 4) of the static seal structure 112. The axial bumper 164 acts as a thrust pad to resist installation load. The axial bumper 164 engaging the inner case member 168 also facilitates heat transfer, which is explained further below.

The ID static seal structure 150 further includes a resilient member 170 coupled to the ID static seal structure generally about the axially extending portion 152 (although the resilient member 170 could be coupled to the transition portion 156 in certain embodiments). The resilient member 170 is biased such that, in a non-compressed condition, the resilient member 170 diverges from the axially extending portion 152 from where it is coupled to the axially extending portion 152 (or the transition portion 156). The distal end 172 of the resilient member 170 (which is generally formed from the same material as the remainder of the ID static seal structure 150, but could be different in certain embodiments) terminates in a support ridge 174. When installed, as shown in FIGS. 4 and 5, the resilient member 170 is compressed by the outer surface of the spindle shaft 102 such that the resilient member 170 is generally parallel to the axially extending portion 152. The outer surface 176 forms seal with the outer surface of the spindle shaft 102. The support ridge 174 contacts the axially extending portion 152 when the assembly is installed on the spindle shaft 102 as shown in FIGS. 4 and 5. The support ridge 174 inhibits over-compression of the resilient member 170 such that there is a gap G between the resilient member 170 and the outer surface of the axially extending portion 152.

FIG. 5 also provides a ID static seal structure 150' that is substantially similar to the ID static seal structure 150. The ID static seal structure 150' provides a support pad 174' that extends from the outer surface of the axially extending portion 152 to contact the resilient member 170 when the resilient member is compressed to form an interference I in place of the gap G above. The ID static seal structure 150' may provide the resilient member 170 with a support ridge 174 at its distal end 172 in certain embodiments.

Figure 6:
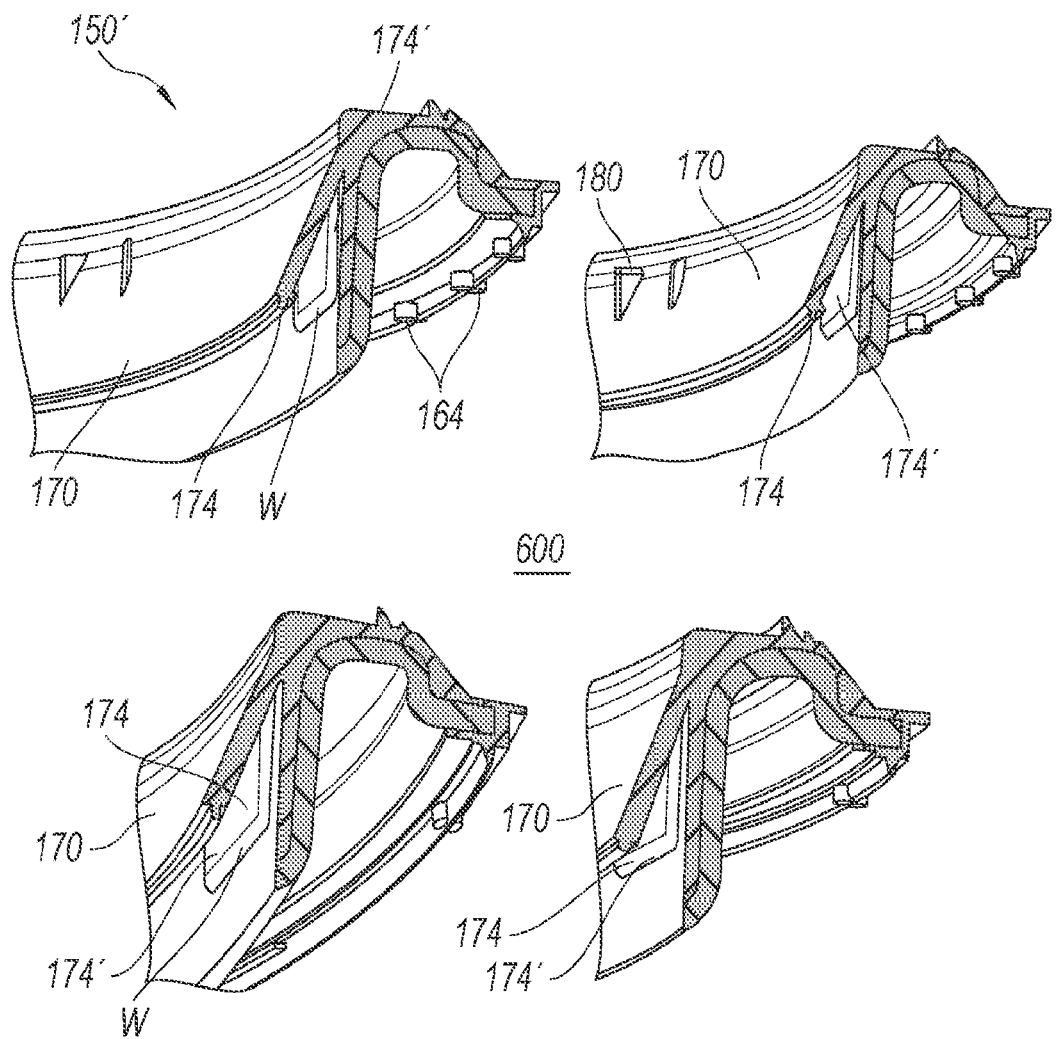
FIG. 6 are additional views of a portion of the wheelend assembly seal of FIG. 4 consistent with the technology of the present application in an uninstalled state.
Figure 7:
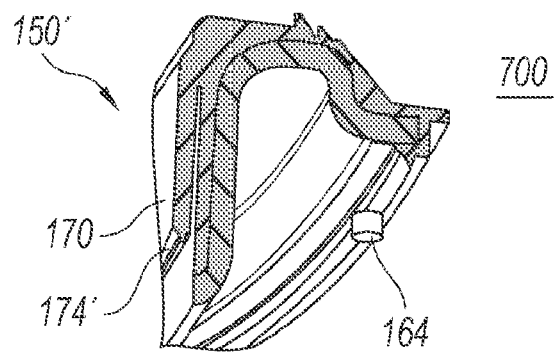
FIG. 7 is a view of FIG. 6 in an installed state.

FIG. 6 shows ID static seal structure 150' in a cross-sectional and perspective view in an uninstalled condition 600. FIG. 7 shows the ID static seal structure 150' in an installed condition 700. As can be appreciated from FIG. 6, the resilient member 170 (sometimes referred to as the seal bead) extends completely and contiguously around the circumference of the spindle shaft 102. The support ridge 174 generally extends completely and contiguously around the circumference as well. The support pad 174', in certain embodiments, may extend completely and contiguously around the circumference. In other embodiments, however, the support pad 174' may comprise a plurality of support pads 174' placed at discrete locations on the ID static seal structure 150'. The width W of the support pads 174' may be varied from installation to installation as exemplified by the support pads 174' have different widths W in the figures. The quantity and width of the support pad 174' would influence the load required to install the wheelend assembly seal 100 onto the spindle shaft 102.

The resilient member 170 provides anti-rotation strength for the ID static seal structures 150 and 150'. In certain embodiments, one or more anti-rotation protrusions 180 may be provided about the resilient member to engage the spindle shaft 102 to provide additional anti-rotation strength. Also, as best seen in FIG. 6, the axial bumper 164 may be arranged in discrete locations around the circumference.

Figure 8:
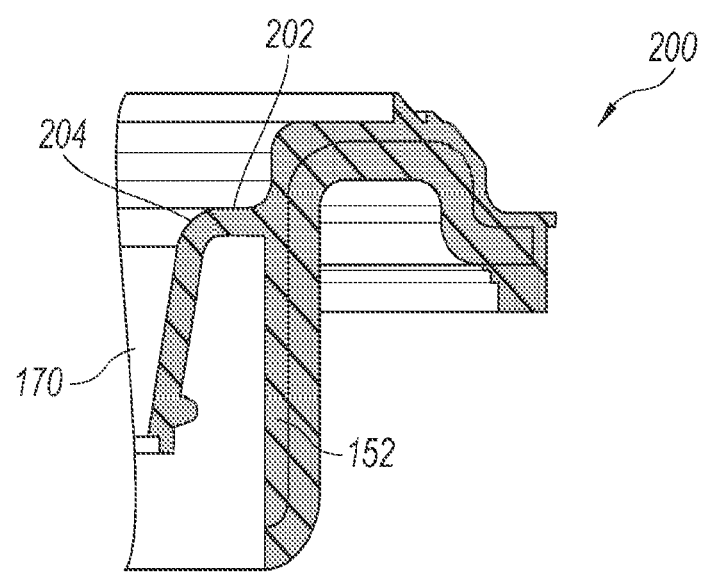
FIG. 8 is a cross sectional view of a portion of another wheelend assembly seal of FIG. 4 consistent with the technology of the present application.

FIG. 8 shows a potential alternative ID static seal structure 200. ID static seal structure 200 is generally similar to the ID static seal structures 150 and 150' explained above. ID static seal structure 200, however, does not have the resilient member 170 coupled to the axially, extending portion 152 (or the transition portion 156) as indicated above but rather provides a ledge 202 that extends radially from the axially, extending portion 152. The resilient member 170 is coupled to the distal end 204 of the ledge 202. The ID static seal structure 200 may include a support pad, such as support pad 174' shown above.

Figure 9:
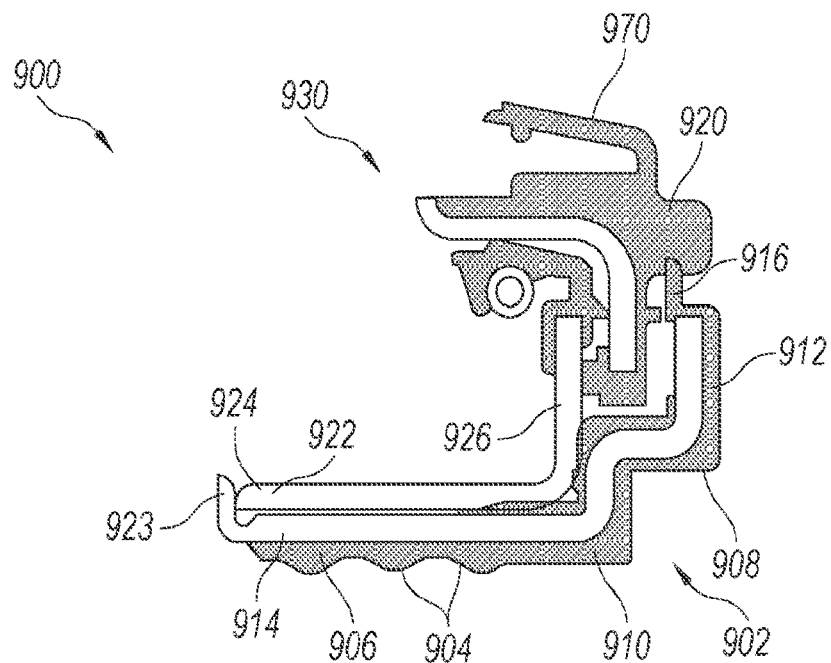
FIGS. 9 and 10 are a cross sectional view of another configuration of the wheelend assembly seal consistent with the technology of the present application.
Figure 10:
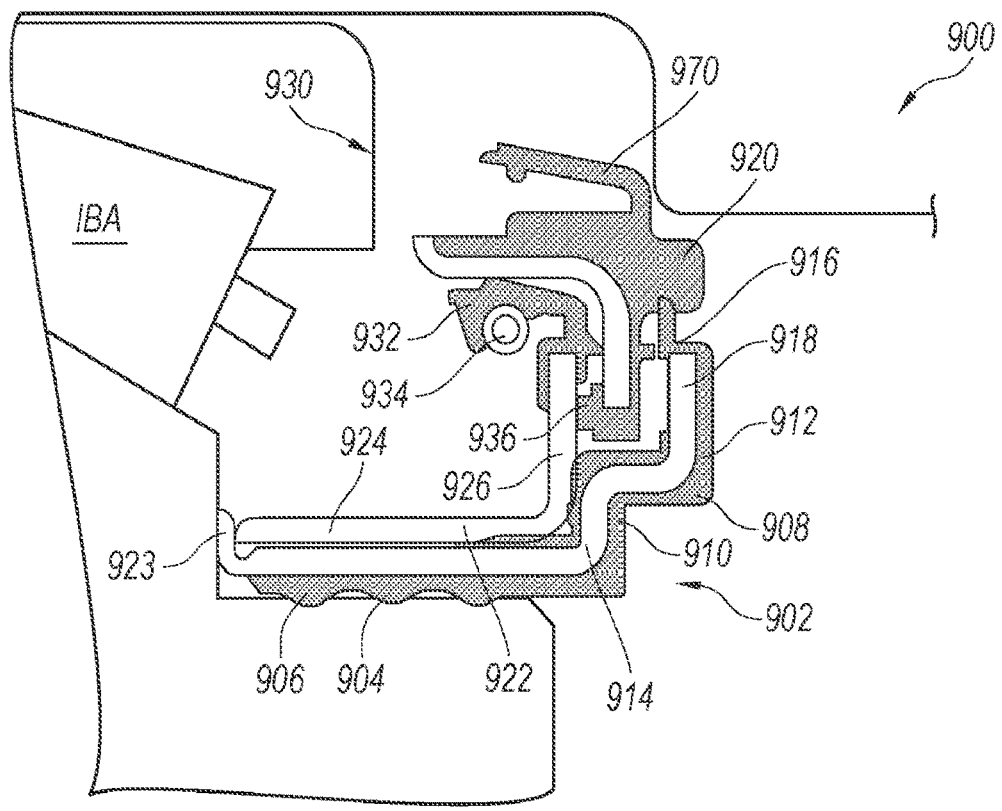

FIGS. 9 and 10 show another configuration of the technology. FIG. 9 shows a cross section of the wheelend seal assembly 900 removed from the wheelend and FIG. 10 shows the cross section of the wheelend seal assembly 900 in relation to the wheelend assembly, although the resilient member 970 is shown in the uninstalled condition. The wheelend assembly seal 900 includes an OD static seal structure 902 with a plurality of seal ribs 904 extending radially outward from the OD static seal structure 902. The OD static seal structure 902 has an axially extending portion 906 and a second axially extending portion 908. A transitional portion 910 is arranged between the first and second axially extending portions 906, 908. The transitional portion 910 is a radially extending portion in this particular exemplary embodiment. The OD static seal structure 902 further includes radially extending portion 912. The OD static seal structure 902 is coupled to an outer case member 914 that is configured coextensively with to the OD static seal structure 902. The OD static seal structure 902 terminates with a contamination member 916 that wraps about a terminal end 918 of the outer case member 914 and bridges a gap to the ID static seal structure 920. An inner case member 922 is shown internal to the OD static seal structure 902 and outer case member 914. At least one or both of outer case member 914 and inner case member 922 includes a unitization member 923. The inner case member 922 includes an axial portion 924 and a radial portion 926, although other configurations are possible. The inner case member 922 facilitates heat transfer as will be explained further below.

FIGS. 9 and 10 also show the wear ring 930 and the ID static seal structure 920, which wear ring and ID static seal structure are configured substantially as explained above. The ID static seal structure 920 is generally co-extensive with the wear ring 930. A dynamic seal 932, with a spring member 934 coupled to the dynamic seal 932, is shown extending between the wear ring 930 and the inner case member 922, which is generally explained above. The ID static seal structure also includes an axial bumper 936 that engages the inner case member 922 to resist installation load. For orientation, FIG. 10 shows a portion of an inboard bearing assembly IBA.

Figure 11:
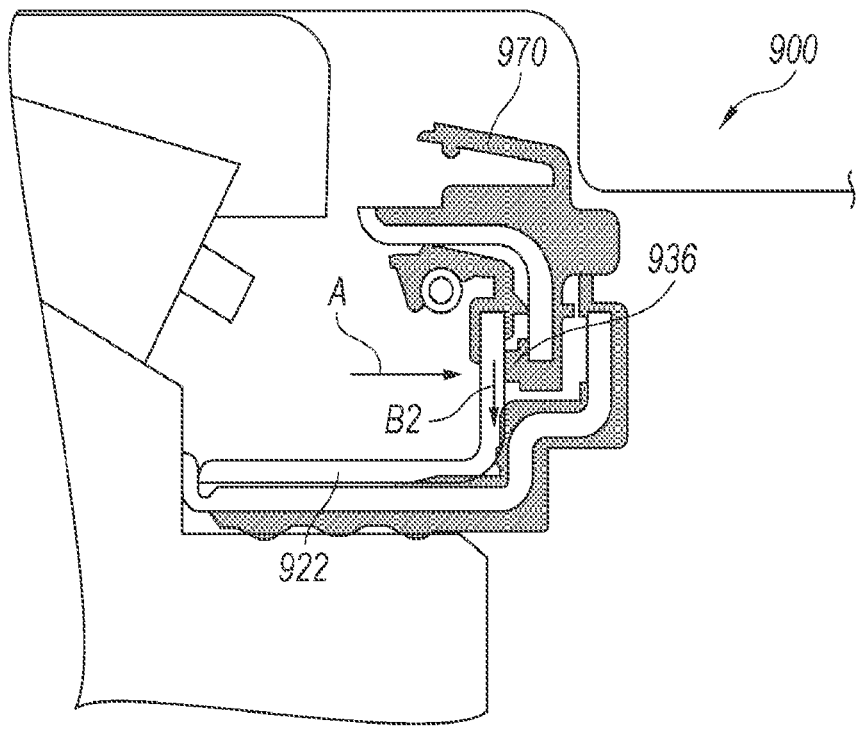
FIG. 11 is a cross sectional view of a wheelend seal consistent with the technology of the present application and certain loads and heat transfer characteristics.
Figure 12:
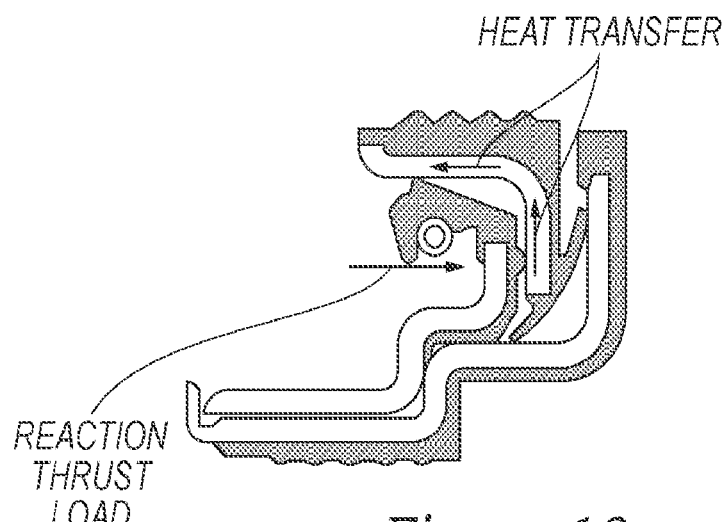
FIG. 12 is a cross sectional view of a prior art wheelend seal.

FIG. 11 is largely a reproduction of FIG. 10, but shows an unexpected benefit of the wheelend seal assembly technology described herein. FIG. 11 depicts the wheelend seal assembly 900 above. During the installation process, the wheelend seal assembly 900 is subject to certain reaction loads as mentioned above. Installation load is placed on the resilient member 970 to compress the same during installation. Moreover, as shown by arrow A, a reaction thrust load is resisted by the axial bumper 936 engaging the inner case member 922. The inner case member 922 acts as a heat sink and heat is transferred along the inner case member 922 as shown by arrow B. This advantageously redirects the heat from the prior art where the heat was transferred along the wear ring and ID static seal structure as shown by FIG. 12.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A seal device for a shaft comprising,
   an outer diameter static seal structure,
   a wear ring, and
   an inner diameter static seal structure, the inner diameter static seal structure comprising:
      an axially extending portion;
      a support pad that resides on the axially extending portion;
      a radially depending portion, wherein the radially depending portion comprises at least one contamination shelf;
      a terminal portion; and
      a resilient member extending axially along the axially extending portion, wherein the resilient member is biased to diverge from the axially extending portion, and wherein the resilient member contacts the support pad at an interference when the resilient member is compressed.

2. The seal device of claim 1 wherein the seal device is configured for installation between a shaft and a hub of a wheelend assembly.

3. The seal device of claim 1 further comprising a wheelend assembly comprising at least an inboard bearing assembly, an outboard bearing assembly, and a hub.

4. The seal device of claim 1 wherein the wear ring and the inner diameter static seal structure are generally coextensive.

5. A seal device for a shaft comprising,
   an outer diameter static seal structure,
   a wear ring, and
   an inner diameter static seal structure, the inner diameter static seal structure comprising:
      an axially extending portion;
      a support pad on the axially extending portion;
      a radially depending portion, wherein the radially depending portion comprises at least one contamination shelf;
      a terminal portion; and
      a resilient member extending axially along the axially extending portion, wherein the resilient member is biased to diverge from the axially extending portion, wherein the resilient member contacts the support pad at an interference when the resilient member is compressed and wherein the resilient member of the inner diameter static seal structure has a distal end and a support ridge protrudes radially from the distal end to contact the axially extending portion when the resilient member is compressed.

6. The seal device of claim 5 wherein a gap exists between the axially extending portion and the resilient member.

7. A seal device for a shaft comprising:
   an outer diameter static seal structure,
   a wear ring, and
   an inner diameter static seal structure, the inner diameter static sea structure comprising:
      an axially extending portion;
      a support pad resides on the axially extending portion;
      a radially depending portion, wherein the radially depending portion comprises at least one contamination shelf;
      a terminal portion; and
      a resilient member extending axially along the axially extending portion, wherein the resilient member is biased to diverge from the axially extending portion, and
      wherein the support pad comprises a plurality of support pads each having a width, wherein the plurality of support pads are not contiguous and are arranged circumferentially around the axially extending portion.

8. The seal device of claim 7 wherein the plurality of support pads are arranged symmetrically.

9. The seal device of claim 7 wherein the plurality of support pads are arranged asymmetrically.

10. A seal device for a shaft comprising:
    an outer diameter static seal structure,
    a wear ring, and
    an inner diameter static seal structure, the inner diameter static seal structure comprising:
       an axially extending portion;
       a radially depending portion, wherein the radially depending portion comprises at least one contamination shelf;
       a terminal portion; and a resilient member extending axially along the axially extending portion, wherein the resilient member is biased to diverge from the axially extending portion;

an outer case member substantially co-extensive with the outer diameter static seal; and an inner case member, wherein the radially depending portion of the inner diameter static sea has an axial bumper configured to engage the inner case member such that the axial bumper resists installation load.

11. The seal device of claim 10 where the inner case member is a heat sink to transfer heat generated by the axial bumper resisting installation load.

\* \* \* \* \*